United States Patent

Eggers et al.

[11] 3,910,178
[45] Oct. 7, 1975

[54] APPARATUS FOR WRAPPING A ROUND BALE FORMED IN A ROUND BALE FORMING MACHINE

[75] Inventors: Edward T. Eggers, New Holland; Harry C. Eberly, Narvon; Allison W. Blanshine, Lititz; Floyd L. Myer, New Holland, all of Pa.

[73] Assignee: Sperry Rand Corporation, New Holland, Pa.

[22] Filed: Oct. 12, 1973

[21] Appl. No.: 405,979

[52] U.S. Cl. .......................... 100/5; 100/13; 100/88
[51] Int. Cl.² .................................................. B65B 13/18
[58] Field of Search .......... 56/341, 343; 100/5, 88, 100/87, 13, 152, 15

[56] References Cited
UNITED STATES PATENTS

| | | | |
|---|---|---|---|
| 2,336,491 | 12/1943 | Luebben | 100/88 X |
| 2,468,641 | 4/1949 | Scranton et al. | 100/88 X |
| 2,581,542 | 1/1952 | Kolzing | 100/88 X |
| 2,627,223 | 2/1953 | Berge | 100/88 X |
| 2,667,729 | 2/1954 | Harrer | 100/88 X |
| 2,696,777 | 12/1954 | Sutch | 100/11 |
| 2,774,296 | 12/1956 | Martinmaas | 100/5 |
| 2,826,985 | 3/1958 | Harrer | 100/88 |
| 2,850,964 | 9/1958 | Harrer | 100/88 X |
| 2,893,308 | 7/1959 | Bodisch | 100/15 |
| 3,004,377 | 10/1961 | Harrer | 56/341 |
| 3,064,556 | 11/1962 | Luebben | 100/88 X |
| 3,722,197 | 3/1973 | Vermeer | 100/88 |
| 3,827,223 | 8/1974 | Blanshine et al. | 100/5 X |

FOREIGN PATENTS OR APPLICATIONS 785,586   10/1957   United Kingdom................... 100/5

Primary Examiner—Billy J. Wilhite
Attorney, Agent, or Firm—Frank A. Seemar; John R. Flanagan; Joseph A. Brown

[57] ABSTRACT

An apparatus for wrapping a round bale formed in a round bale forming machine having a support mounted to the frame and a wrapping material directing member mounted to the support to direct and dispense wrapping material contained on the frame. Moving means are associated with both the support and the mounted directing member to move the member in the vicinity of the formed round bale so that the wrapping material may be dispensed in the immediate vicinity of the bale. Varying means are also provided to automatically vary the tension of the wrapping material as the material is dispensed by the directing member.

11 Claims, 5 Drawing Figures

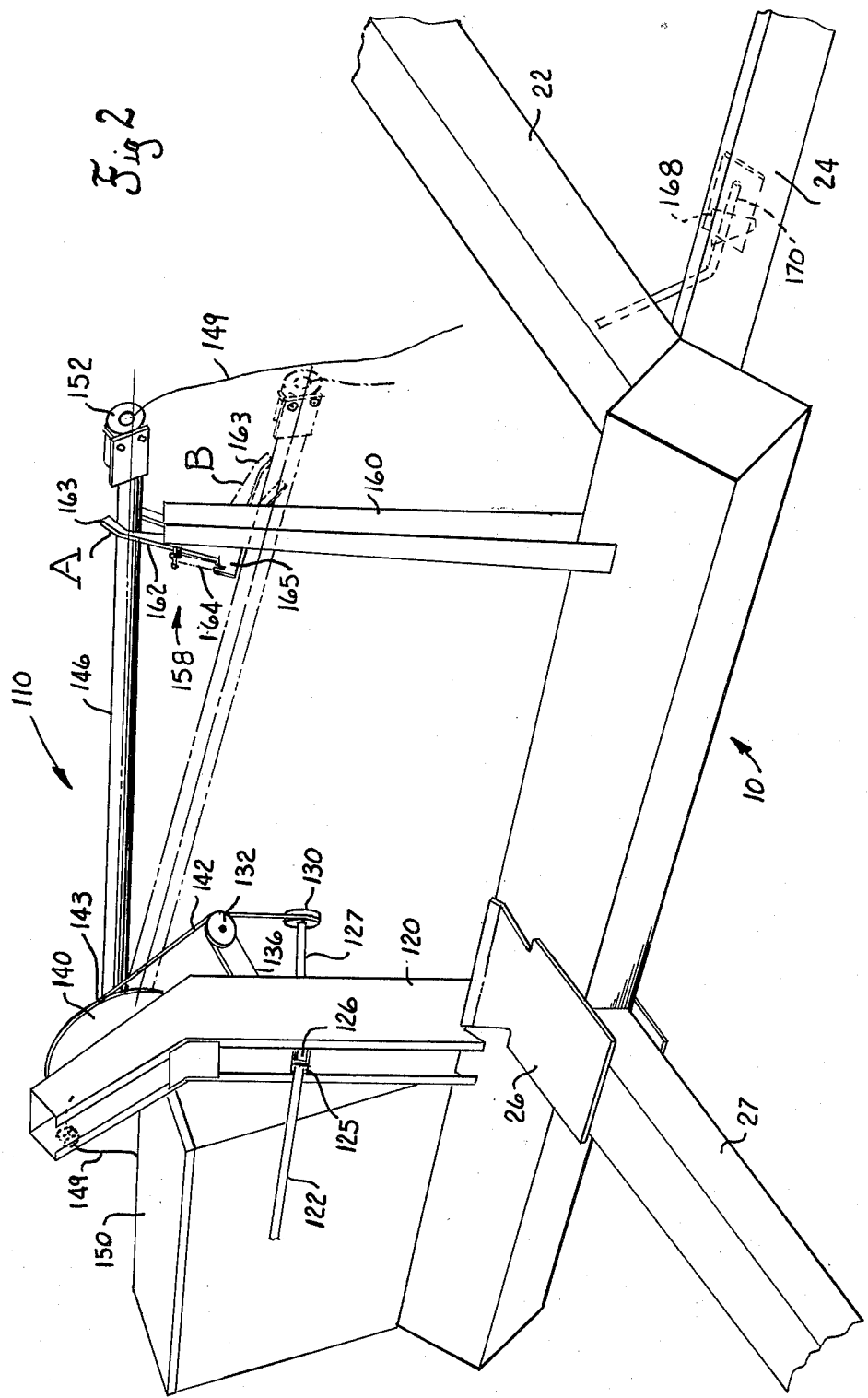

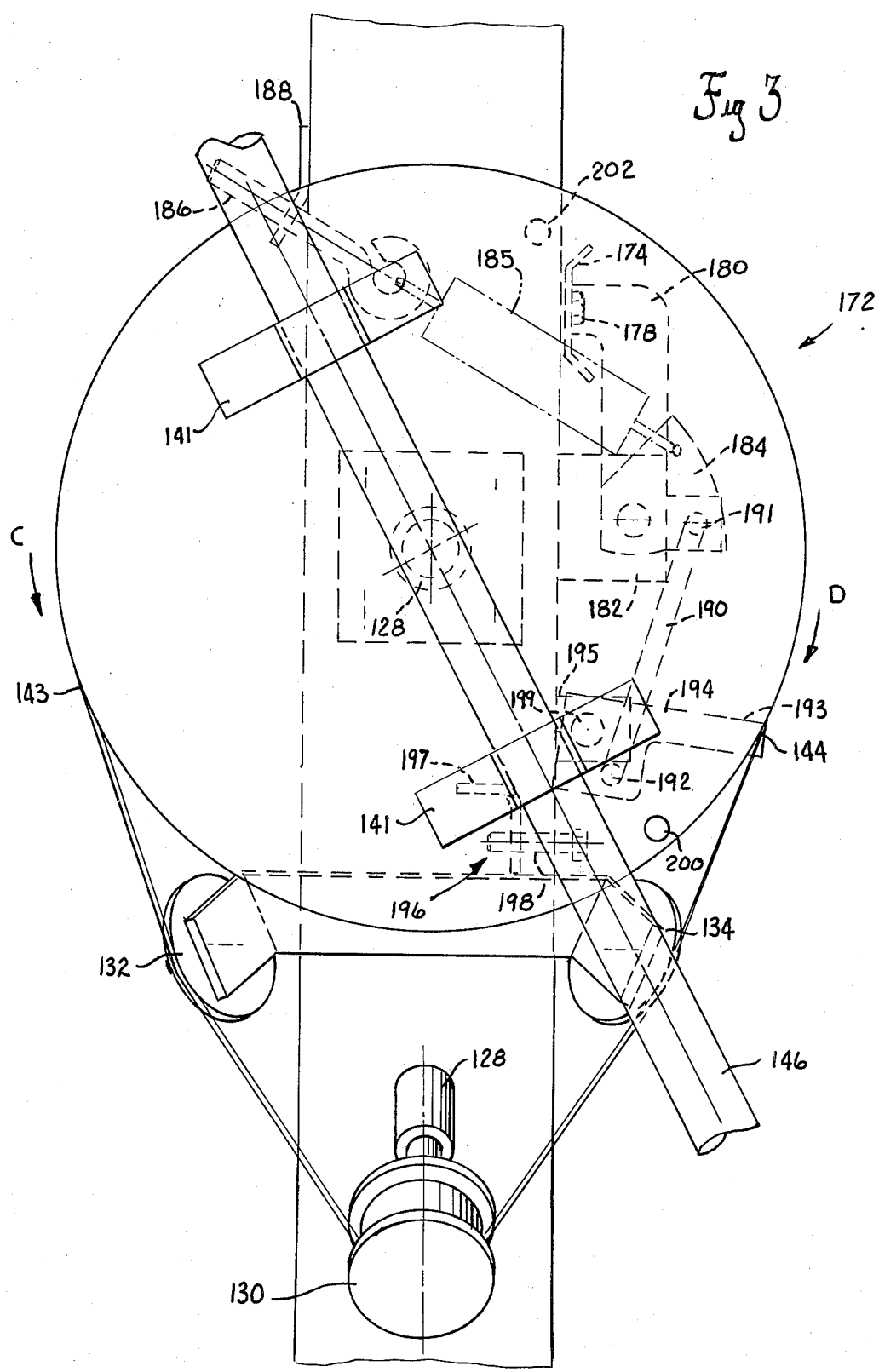

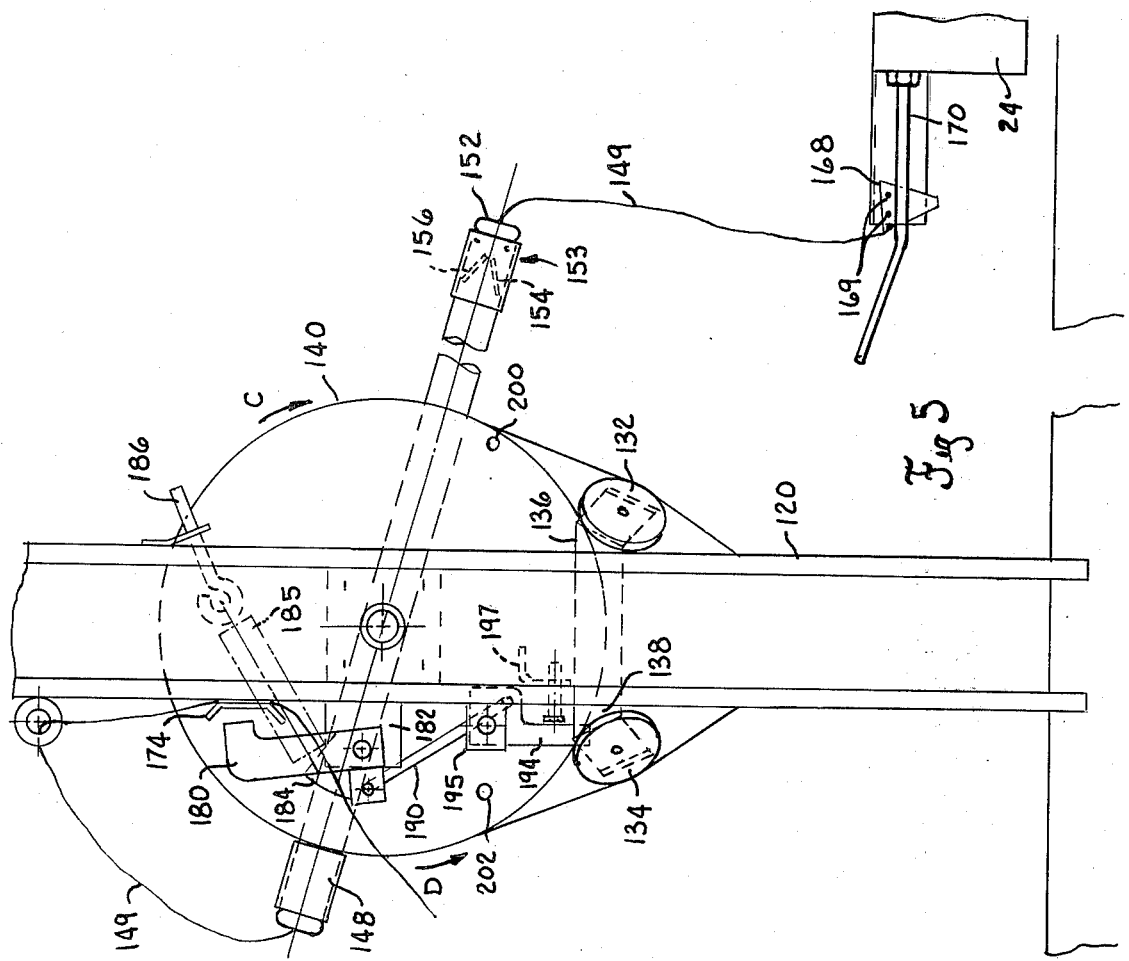
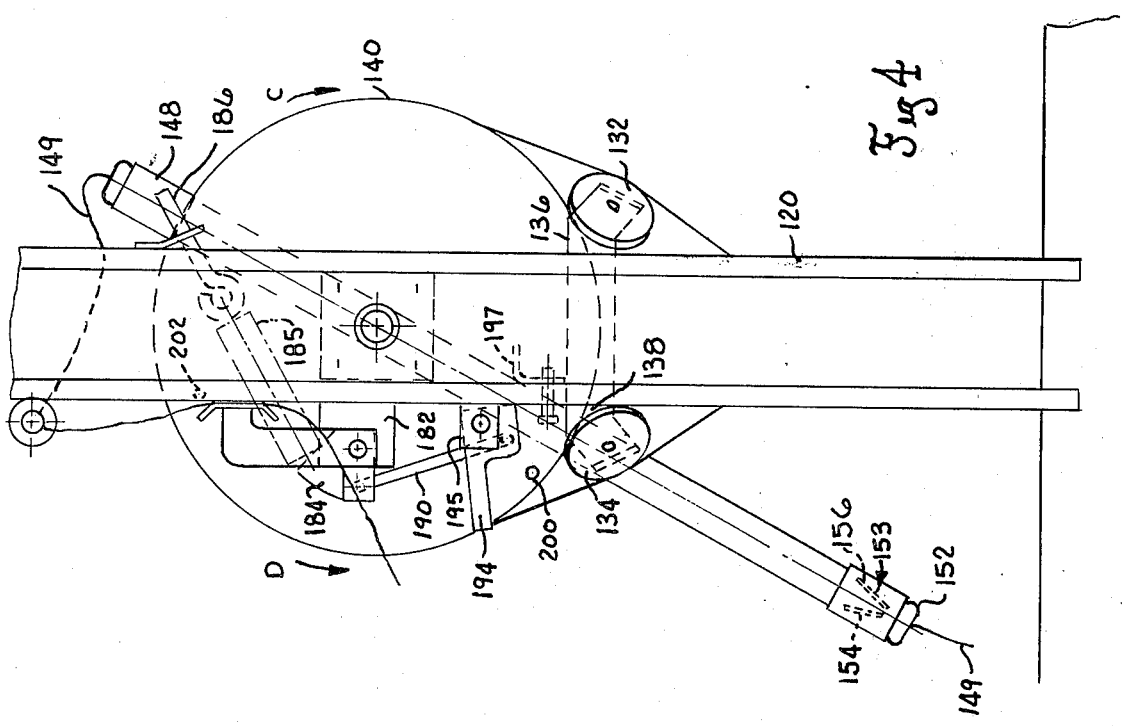

APPARATUS FOR WRAPPING A ROUND BALE FORMED IN A ROUND BALE FORMING MACHINE

BACKGROUND OF THE INVENTION

This invention is directed to round bale forming machines and more particularly to an apparatus for wrapping round bales formed in a round bale forming machine.

For many years, it has been customary to harvest forage crops by mowing the crops, letting them dry in a field, forming the dried crop into windrows, gathering the crops and forming the gathered crop material into rectangular bales.

Recently, it has been found that by forming the crop material into large compact rolls of material, rather than rectangular bales, as previously done, the material in roll form could be deposited and left in the field because the roll of material tends to provide a self-shedding protective covering from inclement weather. Since the round bale can be left in the field the additional steps of gathering the rectangular bales and transporting the gathered bales to a storage area away from the elements can be eliminated.

Several methods for the forming of compact rolls of crop materials have been devised throughout the years. One of these methods rolls the swath or windrow of material along the ground until a roll of desired size is obtained. Another, and more successful method to data comprises a machine described in U.S. Pat. No. 3,815,345 in which a swath or windrow of material is picked up from the field and directed onto a supporting conveyor. This conveyor transports material in one direction while an upper apron, usually positioned above the supporting conveyor, moves in an opposite direction thereby rotating crop material, with which it contacts, in a circular motion. In an off the ground hay roll forming machine of this type, it has been found that to provide optimum weathering characteristics the bale must be rolled and maintained as tightly as possible. The crop material is compacted during the bale forming operation by various types of compression devices which apply pressure to the periphery of the bale as it is being formed. To maintain this compact quality the bale must be secured as tightly as possible when it is in its most compressed state. To this end the formed round bale is wrapped on the hay roll forming machine after it is formed with a suitable wrapping material, e.g., twine, wire, etc., and the bale shape and density is thereby enhanced, even after the bale has been discharged from the round bale forming machine.

It is not uncommon in prior wrapping devices to dispense the wrapping material while the crop material is being fed into the machine. This type of wrapping does not foster the tightest possible configuration of the bale because the wrapping material is fed into the roll prior to its ultimate state of compression.

Another disadvantage inherent in prior wrapping devices is that the roll is wrapped very loosely. This loose wrapping is caused by the necessity to have very little tension on the wrapping material during the initial feeding of the wrapping material around the bale. Prior wrapping devices provided no means to increase the tension of the wrapping material after the initial feeding operation had begun.

OBJECTS AND SUMMARY OF THE PRESENT INVENTION

The principle object of the present invention is to provide an apparatus for wrapping a round bale formed in a round bale forming machine which will tightly and securely wrap a round bale.

Another object of the present invention is to provide an apparatus for wrapping a round bale formed in a round bale forming machine which will vary the tension applied to the wrapping material so that the tension may be varied to initially apply a small amount of tension to the wrapping material, to facilitate the starting of the wrapping operation, and to increase the amount of tension applied to the wrapping material during the course of the subsequent wrapping operation.

Another object of the present invention is to provide an apparatus for wrapping a round bale formed in a round bale forming machine which will initiate the wrapping operation without crop material being simultaneously fed into the machine.

Another object of the present invention is to provide an apparatus for wrapping a round bale formed in a round bale forming machine which can be easily activated and operated by an operator from his seat on the tractor.

A further object of the present invention is to provide an apparatus for wrapping a round bale formed in a round bale forming machine which will automatically cut the wrapping material upon the completion of the wrapping operation.

Other objects and advantages of the present invention will become apparent and obvious from a study of the following description and the accompanying drawings which are merely illustrative of the present invention.

The present invention is directed to an improved apparatus for wrapping round bales, formed in a round bale forming machine, having a support mounted to the frame and a wrapping material directing member mounted to the support to direct and dispense wrapping material contained on the frame. Moving means are associated with the support and the mounted directing member to move the member in the vicinity of the formed round bale. More specifically, varying means are provided to automatically vary the tension of the wrapping material as the material is being dispensed by the directing member.

BRIEF DESCRIPTION OF THE DRAWINGS

FIG. 2 is a perspective view of the apparatus for wrapping round bales formed in a round bale forming machine.

FIG. 3 is a rear view of the support, moving means and varying means of the apparatus for wrapping round bales.

FIG. 4 is a front view of the apparatus for wrapping round bales showing the positioning at which the apparatus begins to apply the greatest tension on the wrapping material.

FIG. 5 is a front view of the apparatus for wrapping round bales showing the positioning of the directing member just as the wrapping material has been severed.

DETAILED DESCRIPTION OF THE PREFERRED EMBODIMENT

Figure 1:
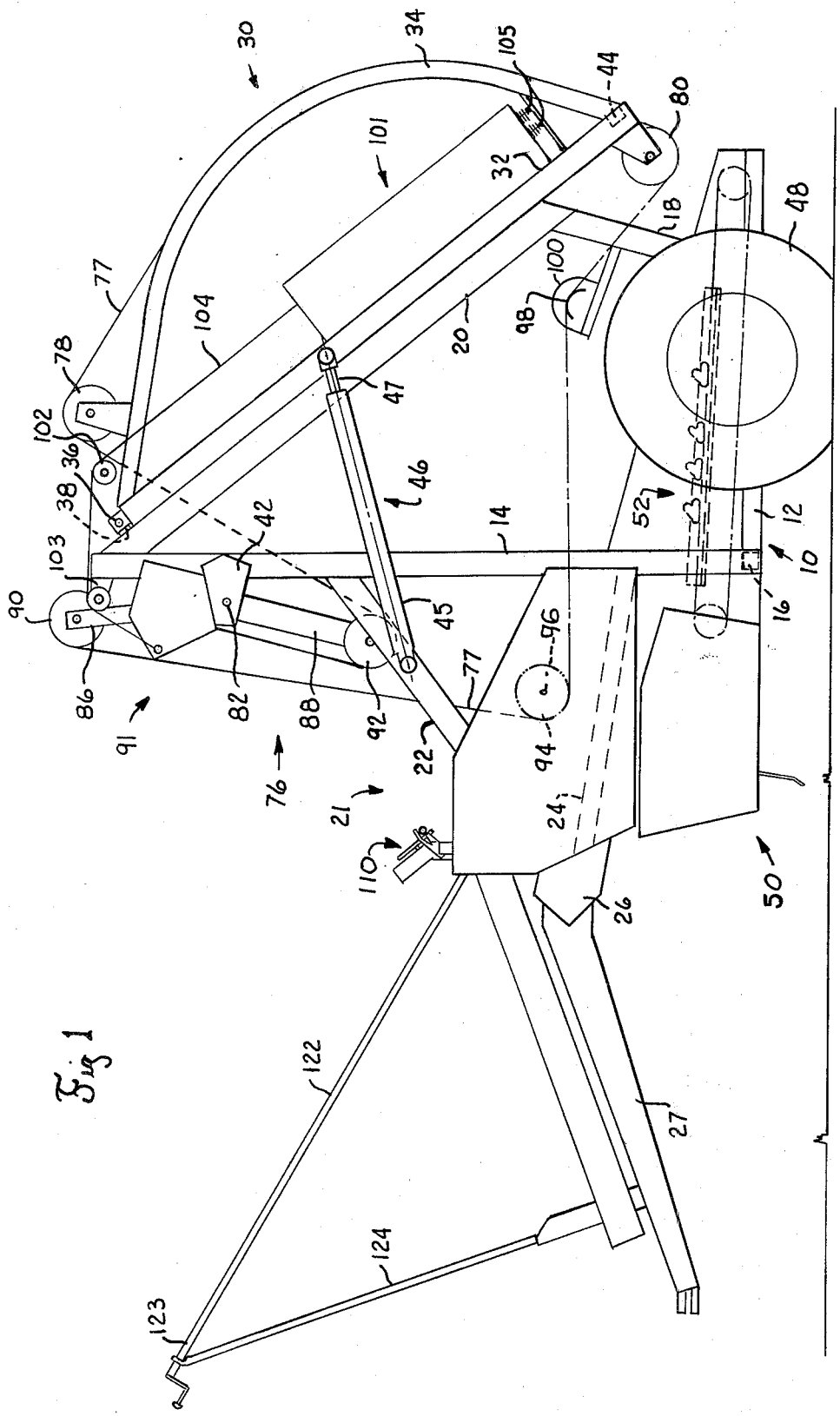
FIG. 1 is a side view of a round bale forming machine.

In the following description right-hand and left-hand reference is determined by standing to the rear of the round bale forming machine and facing the direction of travel.

Referring to FIG. 1, the machine illustrated therein comprises a base frame 10 having sides fixedly connected together, such as by welding or the like. Mounted to each side of said frame is a bottom horizontal member 12. Extending from the forward end of frame 10 is a vertical member 14. Extending perpendicularly to the junction of members 12 and 14 is cross member 16, an end of which is fixedly connected to the junction of members 12 and 14. A short frame member 18 extends upwardly from the rearward portion of body member 12 at the upper end thereof and is connected to one end of an upperwardly and forwardly extending angular brace member 20, which is connected at its upper end to the upper end of vertical member 14. Extending forwardly from member 14, at each side of the machine, is an A-frame 21 consisting of angularly related members 22 and 24, the rearward ends of which are fixed to the front face of vertical member 14 and the forward ends being connected together at plate 26. Tractor hitch 27 is mounted to plate 26 and extends forwardly from the plate.

An upper frame 30 is provided with side frames composed of straight frame members 32, the ends of which are connected to the opposite ends of an arcuate frame member 34. The upper most portion of each side frame member is pivotally connected at 36 to a suitable bearing fixed to the upper end of vertical frame member 14. Frame member 38 extends between the upper end of angular brace member 20 of frame 10 thereby stabilizing the connection of the upper frame 30 at pivotal connection 36. The upper end of base frame 10 is stabilized transversely by a bracing member (not shown) which extend between bearing brackets 42 which are rigidly mounted to the front faces of vertical frame member 14. The lower rearward end of upper frame 30 also has cross frame member 44 extending between the opposite sides of the frame composed of members 32 and 34.

Upper frame 30 is moved from its lower, bale forming position to its extended, bale discharge position by a pair of hydraulic cylinders 46 (one cylinder of the pair being shown in FIG. 1). These hydraulic cylinders have their barrel ends 45 connected to member 22 and their shaft end 47 connected to member 32 of upper frame 30. Suitable hydraulic lines, not shown, are connected to opposite ends of cylinder 46 to simultaneously activate and control the operation of the upper frame.

The base frame 10 has a pair of wheels 48 (one wheel of the pair being shown) connected thereto on opposite sides of the frame by an axle, not shown, in order that the hay roll forming machine may be drawn by a tractor or other suitable implement over a field for purposes of forming a roll of hay or other similar forage material thereon.

Extending forwardly from the front end of base frame 10 is a pickup header 50. This header is adapted to engage, elevate and rearwardly feed a swath or windrow of forage material onto the hay roll forming machine. The material engaged by the header is passed rearwardly from the entrance end of lower apron 52 towards the rear of the machine. The lower apron engages and directs material, received by the header, towards the rear of the machine.

The upper frame 30 contains guide rolls and sprockets which augment and support the upper apron 76, as shown in FIG. 1. The upper apron preferably comprises a pair of endless, flexible link type chains 77 having, at longitudinally spaced intervals, bars (not shown) which extend between said chains the full width of the machine. The bars may be square or of any other suitable geometric shape. The upper apron 76 is supported and driven by various rollers and sprockets. Each side of upper frame 30 contains guide sprockets 78 and 80, which are supported by clevises connected to the opposite ends of the arcuate member 34. Attached to the end of shaft 82, which is supported in bearing brackets 42 adjacent the upper end of vertical frame member 14 are a pair of oppositely extending arms 86 and 88. These arms comprise the expansion means 91 for the upper apron. The ends of said arms support rotatable guide sprockets 90 and 92 upon which the endless chains of upper apron 76 extend in the manner shown in FIG. 1. Connected to the expansion means is spring and cable assembly 101. This assembly contains cable 104 which passes over pulleys 102 and 103. The cable has one end connected to the expansion means and another end connected to spring 105. The springs 105 are mounted to frame 30 so as to exert pressure on the cable to retard the rotation of the expansion means. This assembly, through the operation of the cable assembly, operates to maintain the upper apron in contact with the roll of material that is being formed so a particular density of the roll can be obtained. Driving sprockets 94 are provided at the side of the main frame and are connected to the driven shaft 96 that is supported in appropriate bearings fixed relative to the main frame 10. The lower course of the upper apron 76 also slidably extends over the upper curve surface of movably mounted auxiliary guide members 98. These auxiliary guide members 98 are spring loaded and are adapted to automatically retract into spaces 100 contained in the side plates of the machine. These guide members operate so as not to interfere with the ends of the roll of material as the roll is being formed. Therefore, as the roll increases in diameter the auxiliary guide plates 98 will be pushed through openings 100 thereby not interfering with the end of the roll.

Further description of the particular operation of the overall bale forming operation is deemed unnecessary for a complete understanding of the present invention; it being sufficient in this connection to point out that the material deposited on the floor of the machine is directed rearwardly by the lower apron to a point at which it contacts the upper apron (moving in a direction opposite to the lower apron) thereby rolling the material to obtain a roll of hay having a round shape.

Referring specifically to FIGS. 2 – 5, it is seen that frame 10 also has mounted thereon an apparatus for wrapping the bale formed in the round bale forming machine. The wrapping apparatus 110 comprises a support 120 having one end suitably mounted to frame 10 by welding or the like. Rotatably mounted to support 120 is rod 122. This rod has one end 123 rotatably mounted brace 124 which is rigidly secured to tractor hitch 27. Rod 122 has an end 125 connected to one end of universal joint 126. The universal joint has its other end connected to shaft 127 which is supported for rotation in a suitable bearing 128 and which has a drum 130 rigidly connected to the end of shaft 127 which protrudes through support 120.

Mounted above drum 130 are a pair of pulleys 132 and 134. These pulleys are rotatably mounted on arms 136 and 138 which are fixed to the support and which extend rearwardly from the support.

Rotatably mounted above the pulleys 132 and 134 is a disk 140. This disk is interconnected to the drum by cable 142 which has both of its ends 143 and 144 connected to the disk and which passes around drum 130 and pulleys 132 and 134, respectively. This type of interconnection creates a corresponding movement in the disk whenever the drum is rotated.

Disk 140 has rigidly mounted to its rear face tube 146. This tube is mounted by brackets 141 and has a receiving end 148 which receives wrapping material 149, e.g., twine, etc., stored in container 150, and a dispensing end 152 which operates to dispense and direct the wrapping material during the wrapping operation. Mounted within the tube and in the immediate vicinity of the dispensing end is retarding means 153 comprised of a pair of plates 154 and 156 each plate having one of their ends mounted to the inner wall of tube 146 while their other end just touch each other. This type of configuration (V-shaped) allows the wrapping material to be freely dispensed from end 152 while preventing the wrapping material to proceed back into the tube after the wrapping material has been severed, at the end of the wrapping operation.

The directing and dispensing tube 146 is retained in an inoperative position, during the round bale forming operation by retaining member 158. The retaining member is pivotally mounted to extension 160 which is rigidly mounted to frame 10. The retaining member consists of a plate 162 having a forked shaped end 163 capable of engaging and retaining tube 146. Plate 162 is pivotally mounted to extension 160 by a pivotable shaft, not shown, which permits the plate to move from position A to position B as the wrapping apparatus is activated. A spring 164 has one end mounted to plate 162 and its other end anchored to rigid projection 165 to bias plate 162 in its horizontal retaining position (position A, FIG. 2) so that the tube will be retained in this horizontal position during the round bale forming operation. Spring 164 also aids the plate to return to its retaining position, position A, from its disengaged position, position B at the completion of the bale wrapping operation.

Stationary knife 168 is mounted to member 24 by bolts 169 which pass through the knife and the member of the machine. Various positioning holes are contained in member 24 so that the knife may be moved to various positions to better perform the cutting operation. Guide 170 is secured to the frame and extends over knife 168 to guide the wrapping material into the knife to sever the wrapping material at the end of the wrapping operation.

Disk 140 has connected to its front face a varying means 172 which will vary the tension of the wrapping material, being dispensed by the tube, between predetermined tensions. The varying means consists of a tension clamp 174 mounted to support 120 by spring loaded nuts and bolt assemblies 178. This tension clamp is so positioned on support 120 that the wrapping material will pass between the support and the clamp prior to its insertion into the receiving end of the tube. It is the pressure applied by the tension clamp through its spring loaded nut and bolt connection which applies the initial tension to the wrapping material. As shown in FIGS. 3–5 the varying means also includes a tension arm 180. This tension arm is mounted to cam 184 which is pivotally mounted to plate 182. One end of cam 184 is connected to spring 185 which is adjustably secured to support 120 by bolt 186. Bolt 186 is mounted to extension 188 which is rigidly secured to support 120. This spring exerts a predetermined amount of pressure on cam 184 thereby biasing the cam and the tension towards the tension clamp with a corresponding amount of pressure. Also mounted to cam 184 is rod 190 which has one end 191 mounted to the cam and another end 192 mounted to an L-shaped over center actuating device 194. The actuating device is pivotally mounted to plate 195 at point 199. A stop 196 is mounted to the support and positioned to act as a barrier to the actuating device when it has been moved to the position shown in FIG. 5. The stop 196 includes a bracket 197 rigidly connected to support 120 and adapted to receive and secure a nut 198. This nut can be adjusted to vary the position at which the actuating device will be stopped. To automatically move the actuating device 194 between the position shown in FIG. 4 to that shown in FIG. 5 pins 200 and 202 are mounted to the front face of disk 140 to contact end 193 of the actuating device upon rotation of the disk thereby moving the L-shaped actuating device 194 from the position shown in FIG. 4, to trip tension arm 180 to obtain the greatest tension on the wrapping material, to the position shown in FIG. 5, to move the tension arm from tension clamp 174, after the wrapping material has been severed by the knife 168.

OPERATION

After the round bale has been formed on the round bale forming machine the operator continues to rotate the bale as well as rotating rod 122 thereby simultaneously rotating drum 130 and disk 140. This rotation of the disk will move tube 146 from its inoperative position (position A, FIG. 2) to its initial operative position (position B, FIG. 2). As the operator continues to rotate rod 122 disk 140 will rotate in direction C, shown in FIGS. 3–5. This rotation of the disk will move the dispensing end 152 of the tube longitudinally across the front of the formed round bale as it is being rotated. When the disk has been rotated to the position shown in FIG. 4 pin 200 will hit the L-shaped over center device at end 193 thereby tripping the tension arm so as to apply an additional predetermined amount of pressure to the wrapping material passing between tension clamp 174 and support 120. This additional amount of pressure, applied to the wrapping material, remains until the operator has rotated rod 122, in direction D, and the disk has reached the position as shown in FIG. 5 at which time the wrapping material, still under the additional amount of tension, is pulled over stationary knife 168 thereby severing the wrapping material as shown in FIG. 5. After further rotation of the disk in direction D, the pin 202 will contact end 193 of the L-shaped over center actuating device thereby moving end 193 of the device against stop 196 causing a simultaneous movement of tension arm 180 from tension clamp 174 as shown in FIG. 5. Continued rotation of rod 122 by the operator will bring tube 146 back into contact with retaining member 158 which will hold the tube in a horizontal position away from the material which is being fed into the round bale forming machine.

Since the wrapping material initially has a small amount of tension applied to it, the material can be easily fed under the rotating bale contained on the round bale forming machine. After the wrapping material has encircled a majority of the bale the tension on the wrapping material increases, as shown in FIG. 4, to tightly wrap and secure the bale. It is the varying means which permits a lower amount of tension to be applied to the wrapping material during the initial portion of the wrapping operation which allows the wrapping material to be fed around the rotating bale without simultaneously feeding material into the machine. It is also this varying means which permits the tension of the wrapping material to be increased after the wrapping material has been initially fed around the roll so that a tight and secure round bale can emerge from the round bale forming machine.

While the preferred structure in which the principles of the present invention have been incorporated is shown and described above, it is to be understood that the invention is not to be limited to the particular details, shown and described above, but that, in fact, widely different means may be employed in the practice of the broader aspects of the invention.

Having thus described the invention what is claimed is:

1. An apparatus for wrapping a round bale formed in a round bale forming machine comprising:
   a. a support mounted to the frame of the round bale forming machine,
   b. means operably associated with the frame for containing a supply of wrapping material,
   c. a material directing member adapted to dispense the material,
   d. means for mounting the member to the support in the vicinity of the round bale,
   e. means operably associated with the mounting means for moving said member whereby material is dispensed along a path in the vicinity of the round bale under conditions where said member is moving in such a way as to feed said material around said bale, and
   f. means for automatically increasing, the tension of said material from one level of tension to a second level of tension, under conditions where said material is being continuously fed around said bale.

2. An apparatus for wrapping a round bale formed in a round bale forming machine which comprises:
   a. a support mounted to the frame of the round bale forming machine,
   b. means mounted to the frame for containing a supply of wrapping material,
   c. a material dispensing and directing member mounted to the support,
   d. means operably associated with the material dispensing and directing member to move said member along a path in the vicinity of the round bale in such a way as to feed said material around said bale,
   e. means for automatically increasing and subsequently decreasing the tension of said material between first and second levels of tension, said increase occurring under conditions where said material is being continuously fed around said bale; and
   f. means for automatically cutting said material when the wrapping operation is completed and prior to decreasing the tension of said material to the second level of tension.

3. An apparatus for wrapping a round bale formed in a round bale forming machine comprising:
   a. a support mounted to the frame of the round bale forming machine,
   b. means operably associated within the frame for containing a supply of wrapping material,
   c. a material directing member adapted to dispense the material,
   d. means for mounting the member to the support in the vicinity of the round bale,
   e. means operably associated with the mounting means for moving said member whereby material is dispensed along a path in the vicinity of the round bale under conditions where said member is moving in such a way as to feed said material around said bale,
   f. said moving means comprising a rod rotatably mounted to said support, a first rotatable means mounted to one end of said support, a second rotatable means mounted to said support, and means interconnecting the first and second rotatable means whereby rotation of the rod will impart a corresponding rotation to said first means thereby creating a corresponding rotation in said second means, and
   g. means for automatically increasing or decreasing the tension of said material under conditions where said material is being dispensed.

4. Apparatus as set forth in claim 3 wherein said first rotatable means comprises a drum rigidly mounted to said one end of said support.

5. Apparatus as set forth in claim 4 wherein said second rotatable means comprises a disk rotatably mounted to said support.

6. Apparatus as set forth in claim 5 wherein the interconnecting means comprises a cable having one end connected to said drum and the other end connected to said disk so that any rotation of said drum will impart a corresponding rotation of said disk.

7. Apparatus as set forth in claim 3 wherein said member comprises a tube having a receiving end rigidly mounted to said second rotatable means and a dispensing end located at the other end of the tube so that rotation of said second rotatable means will impart a corresponding movement to the tube thereby moving the dispensing end along the path in the vicinity of said round bale.

8. Apparatus as set forth in claim 7 wherein said tube includes a means to retard movement of said material rearwardly into said tube after said material has left said dispensing end.

9. Apparatus as set forth in claim 8 wherein the retarding means comprises:
   a pair of plates each having one end mounted to the inside wall of said tube and outer ends positioned so as to just touch each other so that said material can pass between the plates.

10. An apparatus for wrapping a round bale formed in a round bale forming machine which comprises:
    a. a support mounted to the frame of the round bale forming machine, b. means mounted to the frame for containing a supply of wrapping material,
c. a material dispensing and directing member mounted to the support,
d. means operably associated with the material dispensing and directing member to move said member along a path in the vicinity of the round bale in such a way as to feed said material around said bale,
e. means for automatically varying the tension of said material between predetermined levels of tension as said material is dispensed in the vicinity of said bale,
f. said varying means comprising a tension clamp mounted to said support in such a way as to permit said wrapping material to move between said support and the clamp, a tension arm pivotally mounted to said support, and means operably associated with the tension arm to automatically either activate said tension arm so that said tension will be brought and maintained in contact with said clamp thereby moving and maintaining said clamp closer to said support adding additional tension to said wrapping material or remove said tension arm thereby removing the additional tension from said wrapping material, and
g. means for automatically cutting said material when the wrapping operation is completed.

11. Apparatus as set forth in claim 10 wherein the cutting means comprises a stationary knife mounted to said frame in such a position that said material will be drawn across the knife at the completion of the wrapping operation thereby severing the material.

* * * * *